Sept. 20, 1960
L. ARNETT ET AL
2,953,171
BEVERAGE BREWING AND DISPENSING APPARATUS
Filed April 23, 1958
10 Sheets-Sheet 1
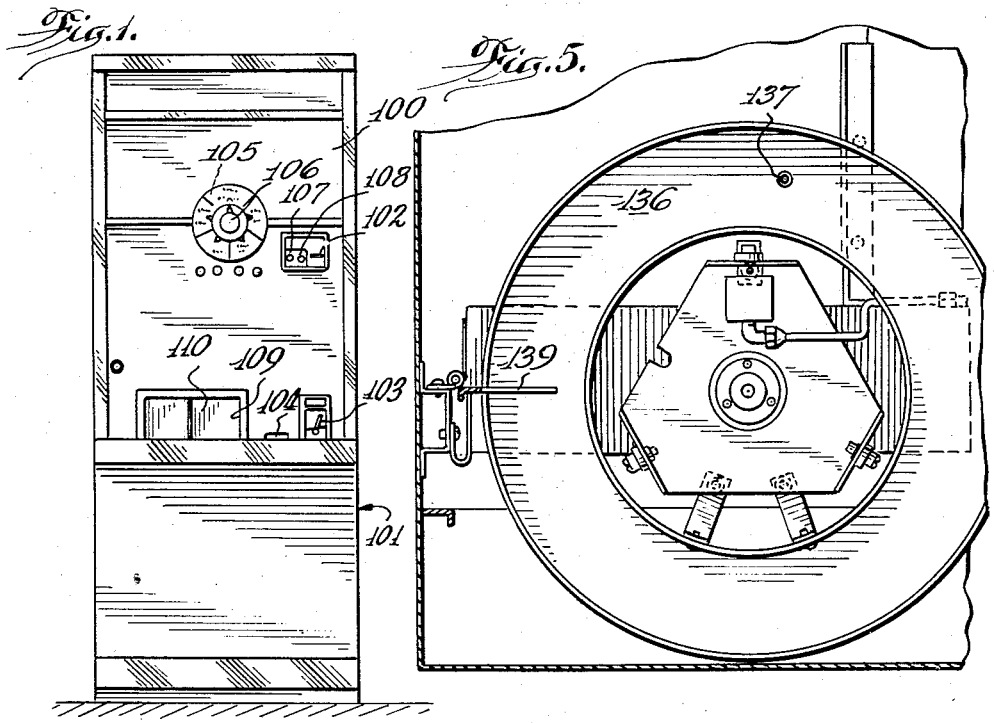
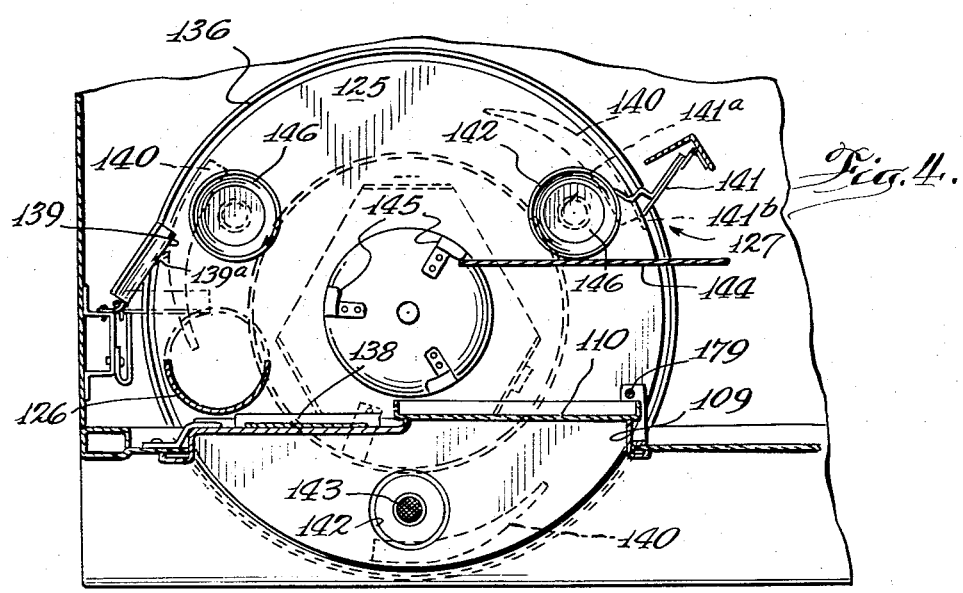
Inventors:
Leslie Arnett
William G. Freise
By Schroeder, Hofgren, Brady & Wegner
Attorneys

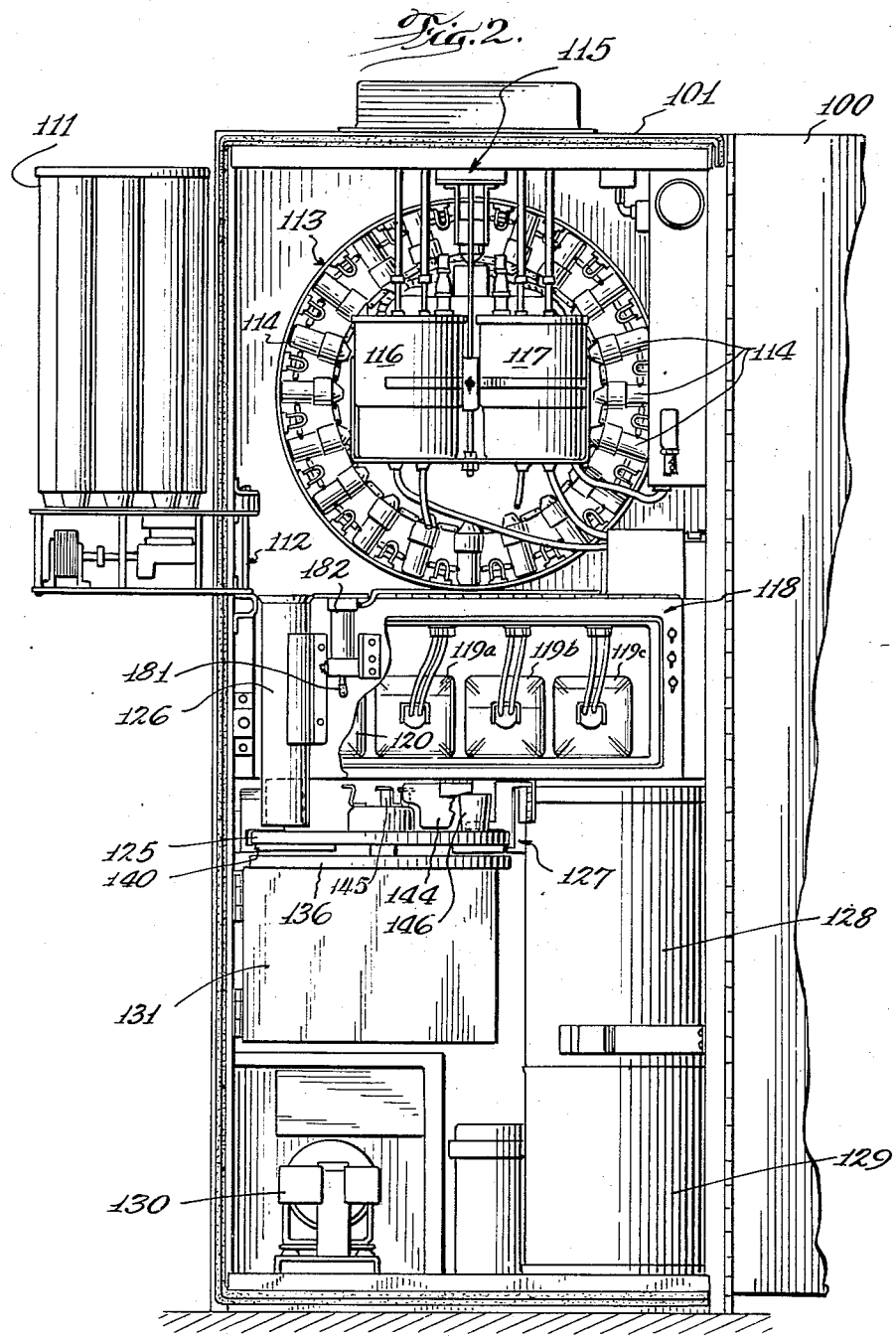

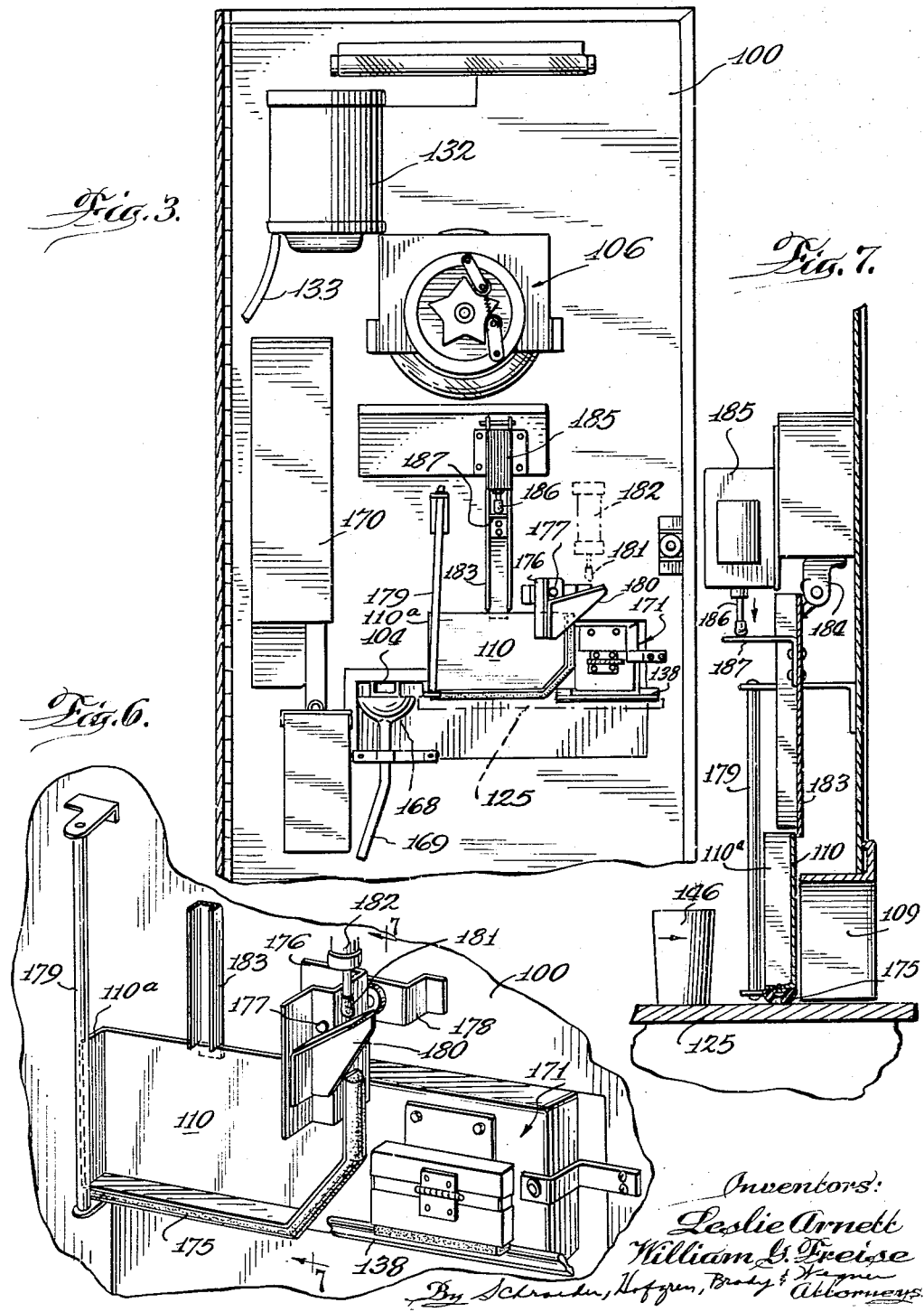

Sept. 20, 1960   L. ARNETT ET AL   2,953,171
BEVERAGE BREWING AND DISPENSING APPARATUS
Filed April 23, 1958   10 Sheets-Sheet 4
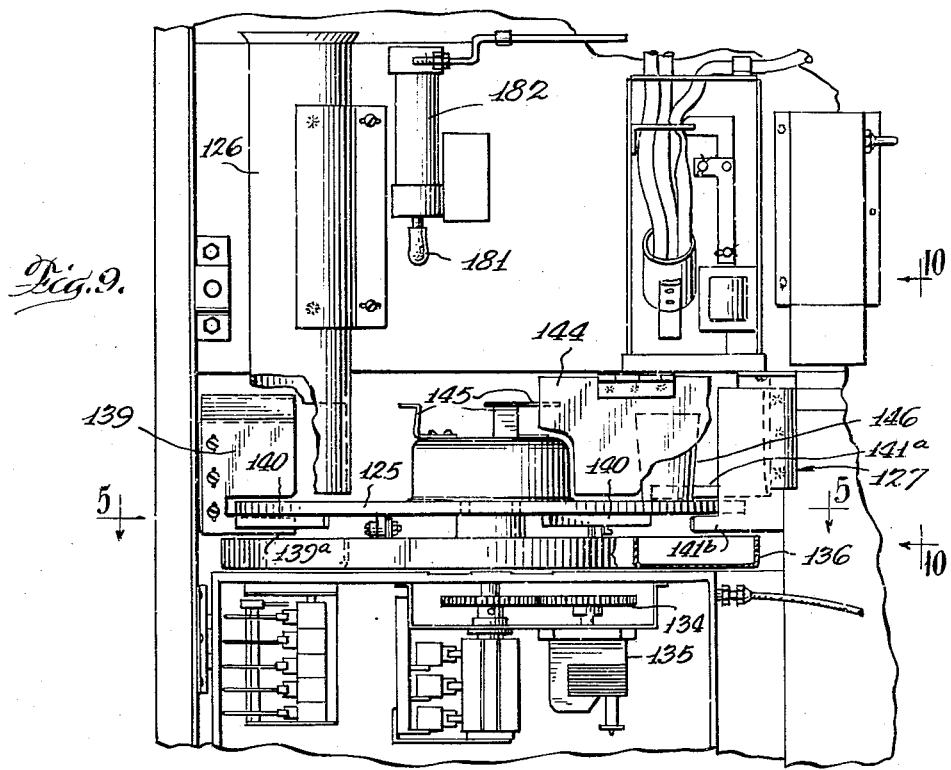
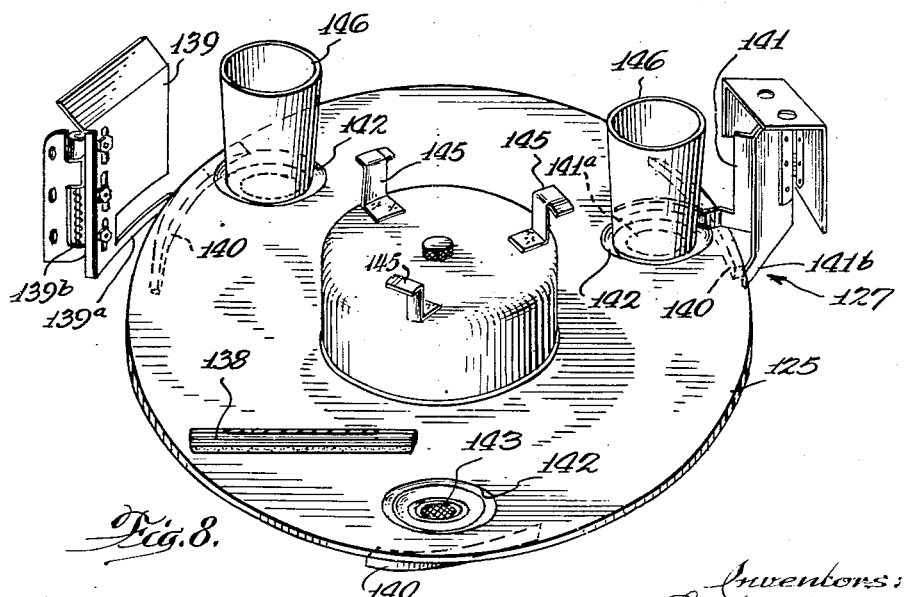

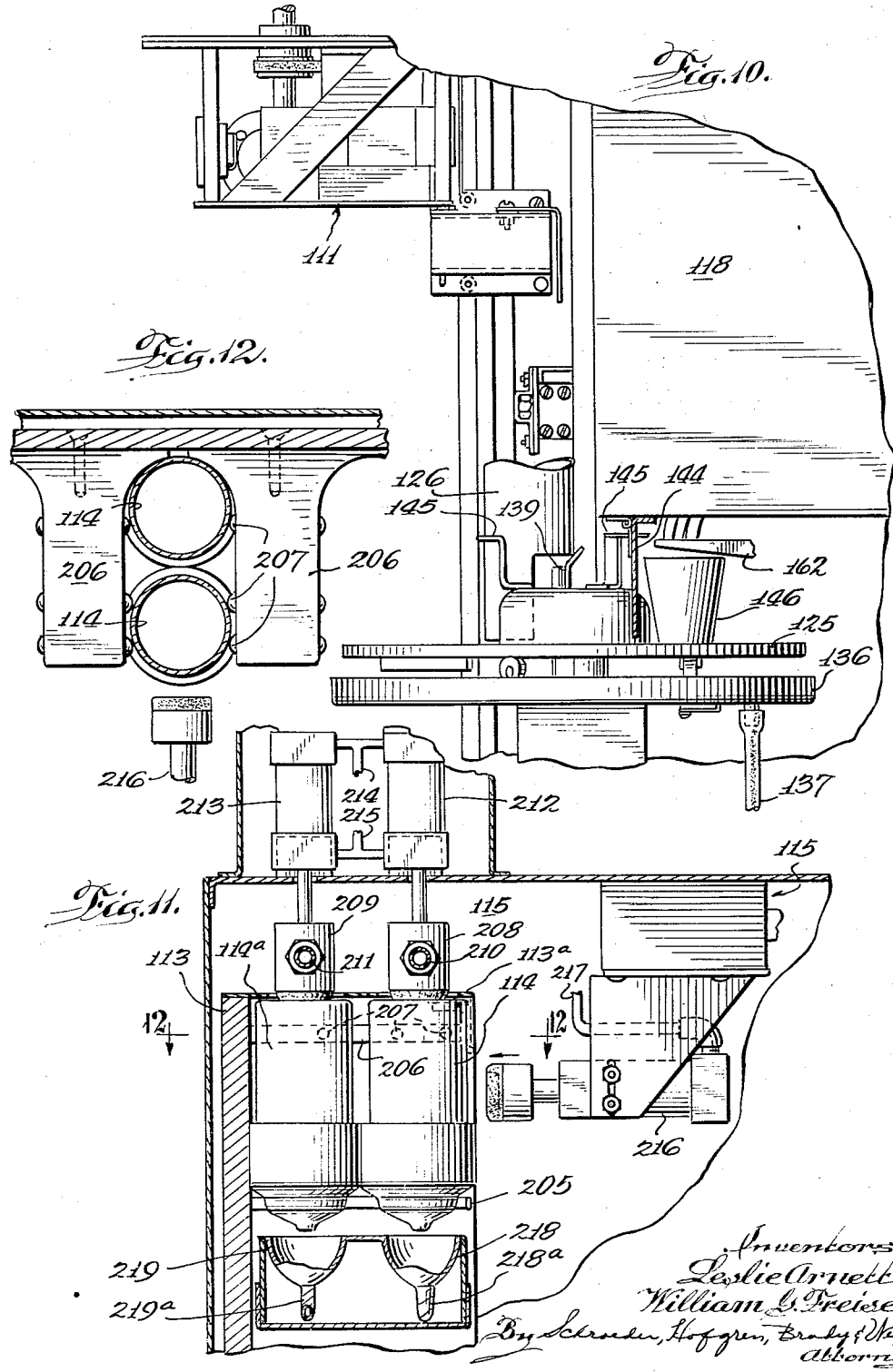

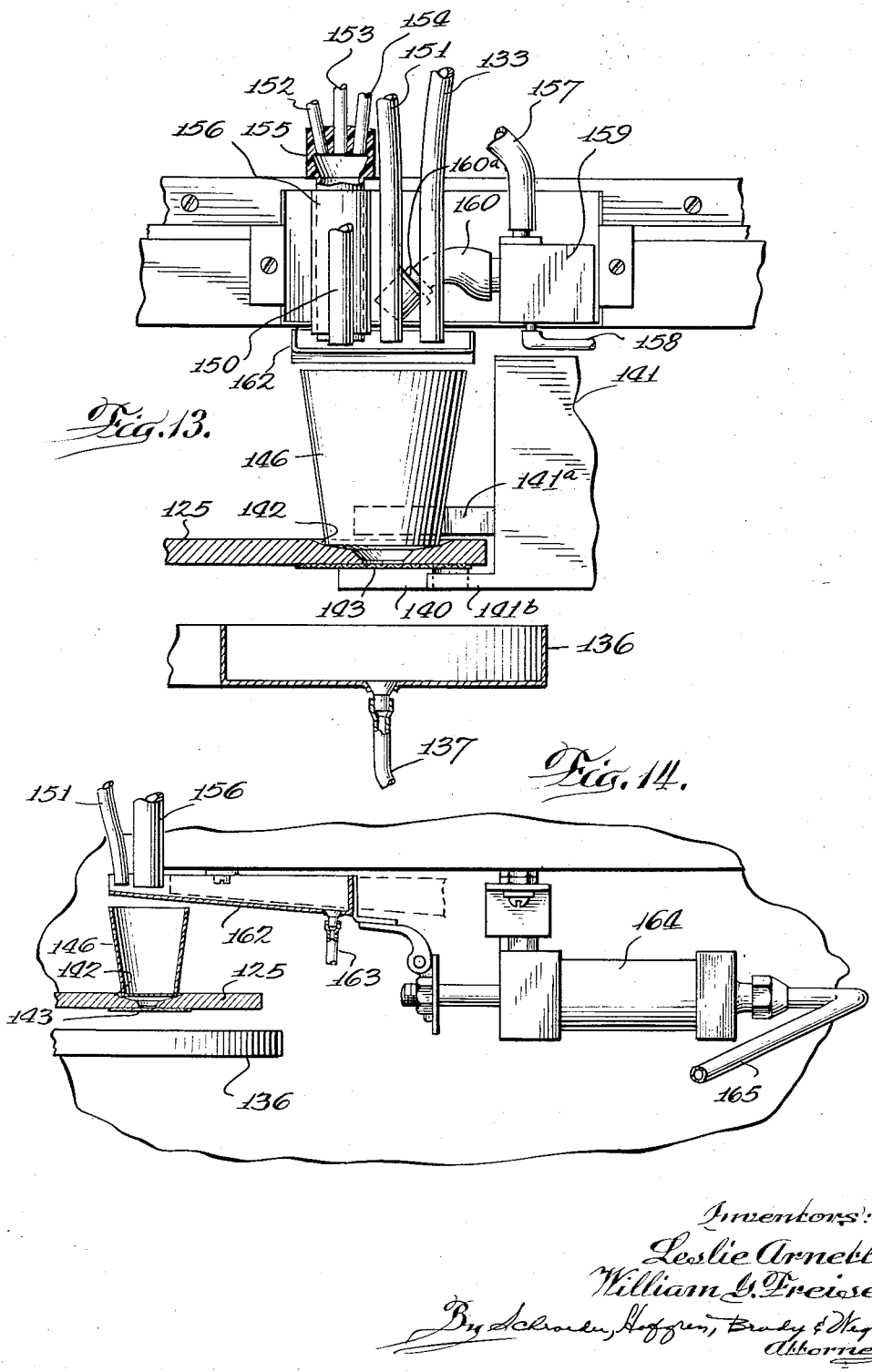

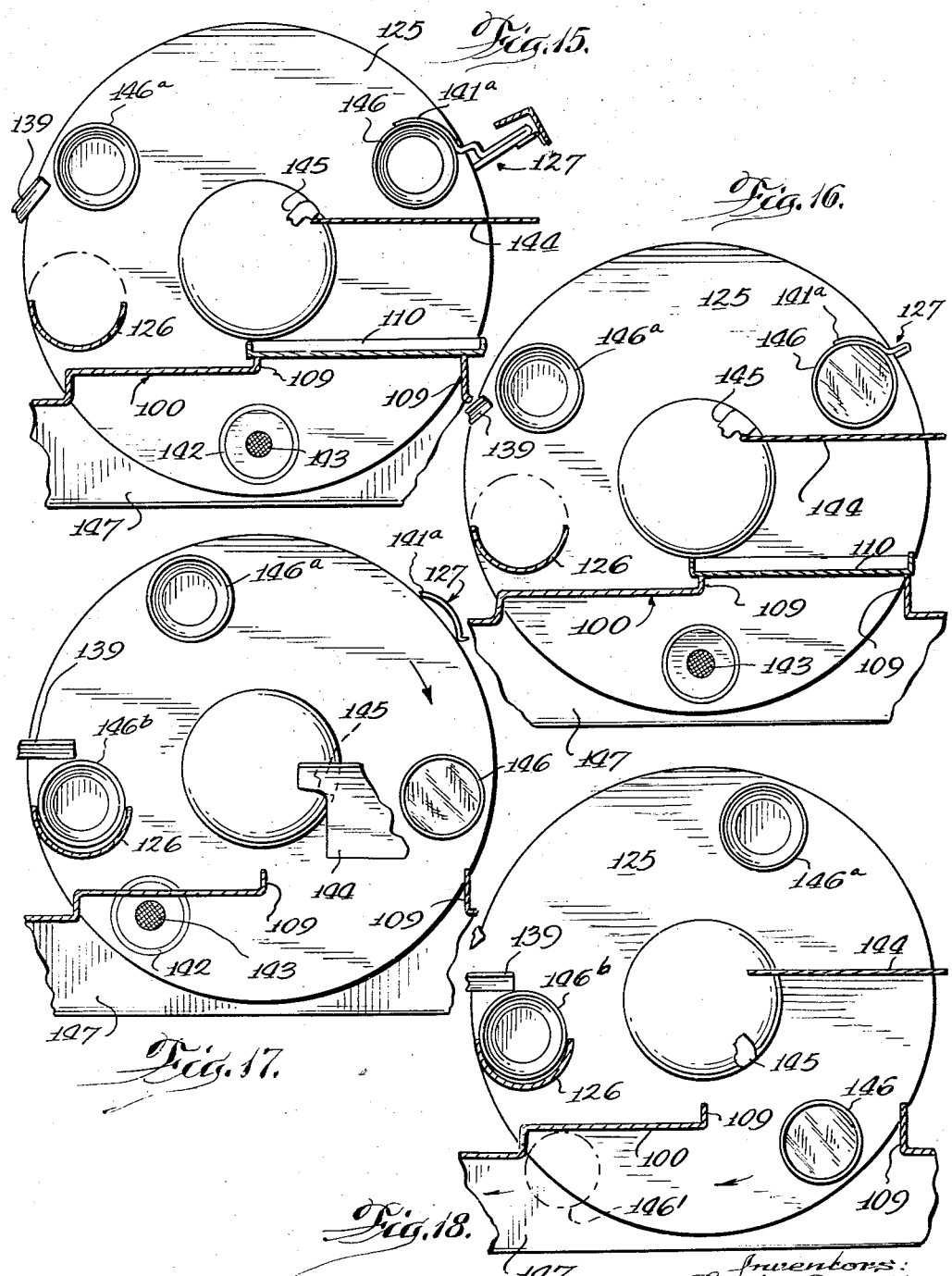

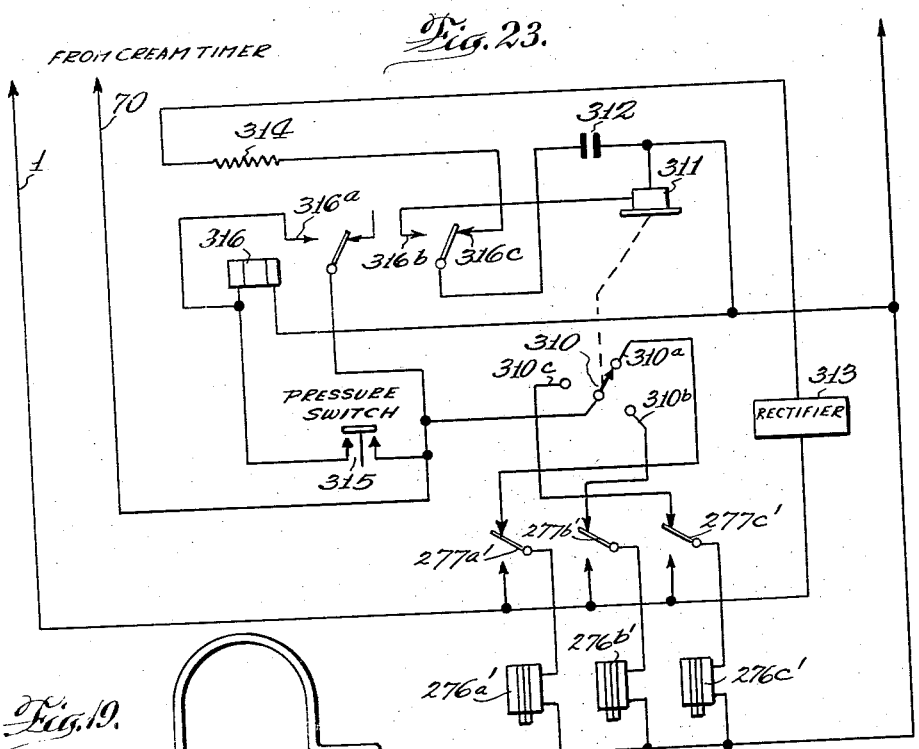
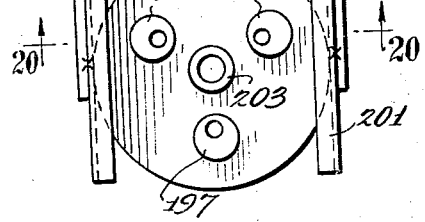
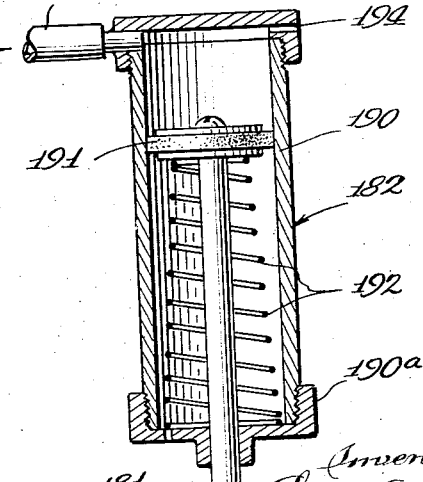
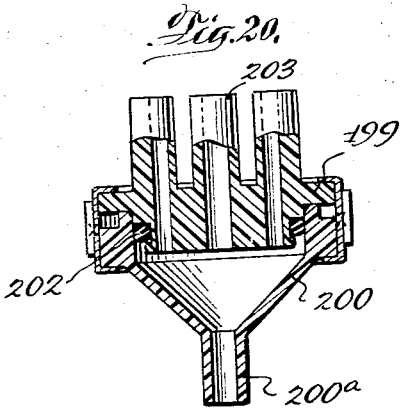

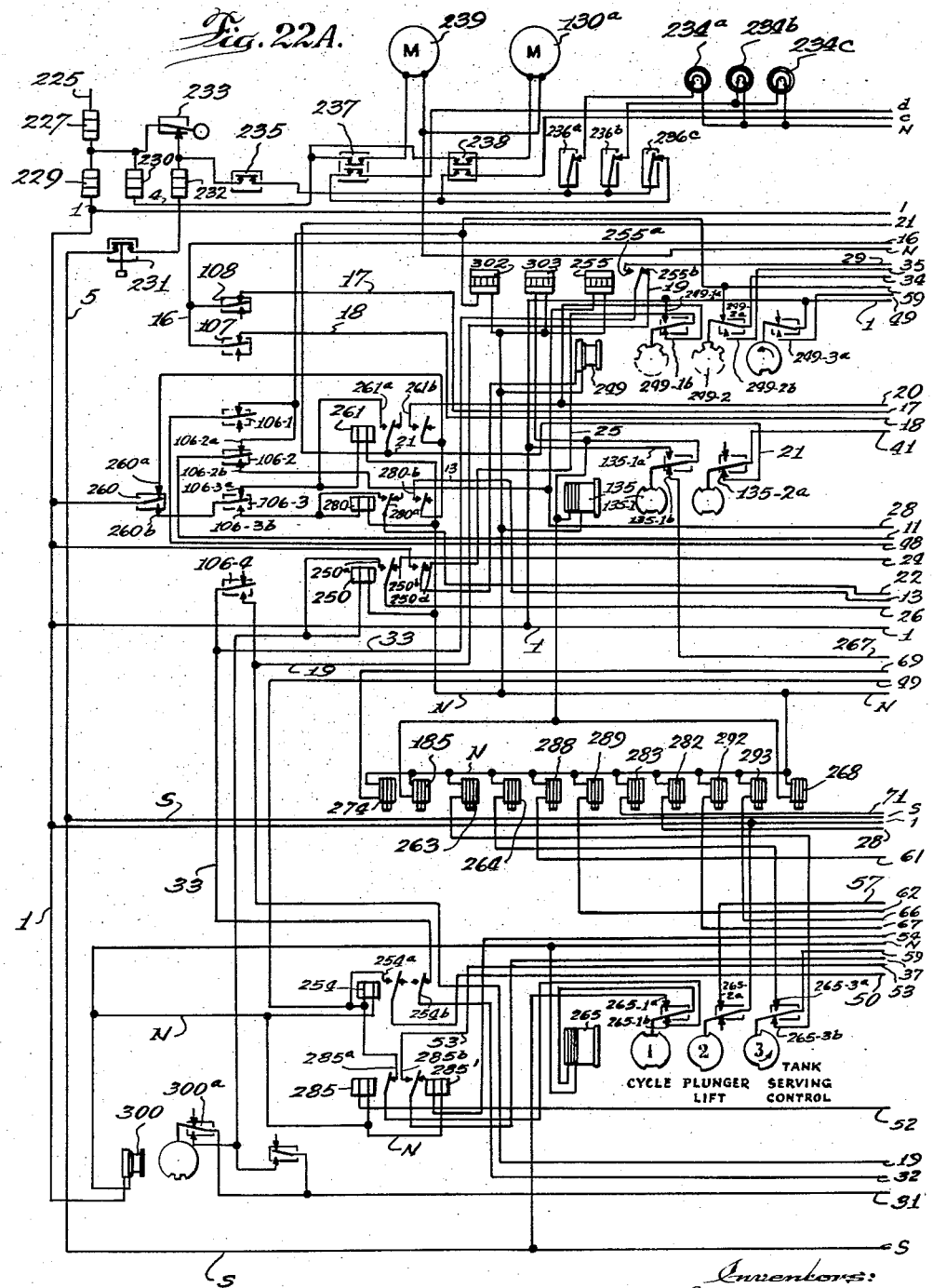

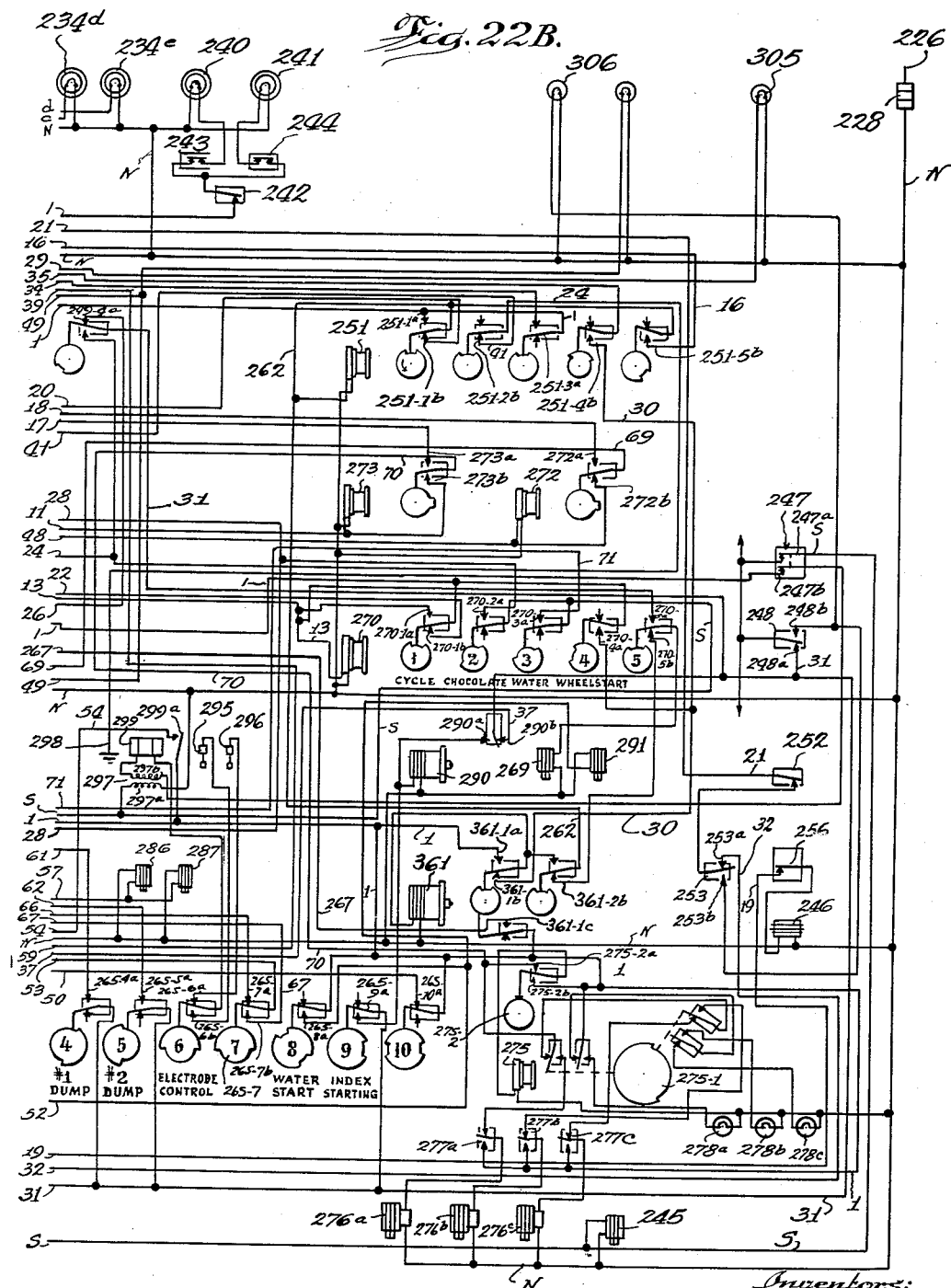

United States Patent Office 2,953,171
Patented Sept. 20, 1960

2,953,171

BEVERAGE BREWING AND DISPENSING APPARATUS

Leslie Arnett and William G. Freise, Chicago, Ill., assignors, by mesne assignments, to United Coffee Corp., Chicago, Ill., a corporation of Delaware Filed Apr. 23, 1958, Ser. No. 730,411

10 Claims. (Cl. 141—174)

This invention is concerned with a beverage preparing and dispensing machine and more particularly with a coin-actuated coffee and hot chocolate preparing and vending machine.

The present invention represents an improvement over the beverage vending and dispensing machines disclosed and claimed in Arnett Patent 2,761,200 and in copending Arnett and Freise application, Serial No. 540,252 filed October 13, 1955, now Patent 2,935,010.

A principal object of the invention is to provide an improved dispensing and brewing mechanism and suitable electrical controls therefor.

One feature of the invention is the provision in a dispensing machine of a movable cup carrier on which a cup is placed, then filled with a beverage, the carrier moving the cup through an opening in the dispenser housing to position it outside the housing in order that a customer may readily receive the completed beverage. Another feature is that the opening in the housing is provided with a door which is opened in synchronism with the operation of the carrier. A further feature is that the cup supply mechanism operates to drop a cup onto the carrier, and means are provided for restraining movement of the cup with the carrier until it is properly positioned thereon. Still another feature is the provision of means for supporting the cup on the carrier at the dispensing point to prevent the force of the beverage entering the cup from knocking it over. Yet a further feature is the provision of a gate interposed between the cup at the dispensing position and the door in the housing.

Another feature is the provision of a brewing mechanism in which a percolator is positioned at a brewing point or station and fluid operated piston and cylinder means are provided for effecting relative movement between the percolator and a connector means communicating with a source of brewing liquid. Still a further feature is that the connector means is positively moved toward and away from the percolator at the brewing station by a double-acting air cylinder device.

And another feature is the provision at the dispensing point, adjacent the beverage ingredient conduits of a movable shutter which receives drippage from the conduits and which is moved out of the way during a dispensing operation.

A further feature is the provision of a beverage dispensing machine having a plurality of containers of beverage ingredient, means for delivering beverage ingredient from the containers to the dispensing point, means for selectively discharging ingredient from only one of the containers at a time, and means operable as a function of the quantity of the ingredient dispensed for selecting a container from which to dispense. Another feature is the use of a counter for controlling the operation of the beverage ingredient dispensing valves. A further feature is that an air pressure system is utilized for discharging the beverage ingredient and means responsive to a release of pressure from one of the containers, upon emptying thereof, is utilized for actuating the control for selecting the container from which to dispense.

Another feature is that the machine includes supplies of beverage ingredient for at least two basically different beverages, with a first dispensing timer for one beverage and a second dispensing timer for another beverage, means for selectively actuating the dispensing timers, and means actuated by the selected timer for dispensing a portion of the selected beverage and including certain means actuated regardless of which timer is selected, as the cup dispensing mechanisms and the cup carrier mechanism.

Yet a further feature is the provision in a beverage dispenser of a gravity system for delivering beverage from a dispensing container to a dispensing point, valve means for controlling the dispensing and timing means for operating the valve for successively longer periods to dispense identical quantities of beverage as the level in the container drops. Still another feature is that the valve controlling circuitry includes a first timer for energizing a portion of the dispensing control circuits, as the cup dispenser and cup carrier, and a second timer, actuated by the first, for energizing the remainder of the circuits and including means for increasing the beverage dispensing period on successive cups.

Another feature is that a step timer is utilized which completes a cycle of operation during the dispensing of the beverage from one container, and beverage brewing means are actuated by the step timer to prepare fresh beverage when the container has been depleted.

And still a further feature is that the dispensing machine includes an electrical power circuit which energizes heating elements of a brewing liquid heater, a refrigeration system and an air pressure system, and an arrangement is provided for disconnecting a portion of the heater elements when the refrigeration and air compressor systems are operating to keep the maximum power requirements of the machine at a minimum.

Further features and advantages of the invention will readily be apparent from the following specification and from the drawings, in which:

Figure 1 is a front elevation of a beverage dispensing machine embodying the invention;

Figure 2 is an elevation of the inside of the machine with the cup mechanism swung out of the way and a portion of the cooler box broken away;

Figure 3 is a rear elevation of the front panel of the machine;

Figure 4 is a plan view of the cup carrier or turntable;

Figure 5 is a view similar to Figure 4 with the turntable removed, taken generally along line 5—5 of Figure 9;

Figure 6 is a perspective illustrating details of the access door for the opening in the front panel of the machine;

Figure 7 is a vertical section taken generally along line 7—7 of Figure 6;

Figure 8 is a perspective of the turntable;

Figure 9 is an elevation of the turntable and dispensing conduit arrangement at the dispensing point;

Figure 10 is a fragmentary elevation taken generally along line 10—10 of Figure 9;

Figure 11 is a detailed elevation of a percolator mounting;

Figure 12 is section taken generally along the line 12—12 of Figure 10;

Figure 13 is an enlarged view of a cup positioned at the dispensing point;

Figure 14 is a view taken from the right of Figure 13;

Figures 15–18 are a series of views illustrating the sequence of operations of the turntable during a dispensing cycle;

Figure 19 is a plan view of a modified cream control air separator;

Figure 20 is a section taken generally along line 20—20 of Figure 19;

Figures 21 is a section of the air cylinder which operates the access door;

Figure 22, comprising portions 22A and 22B, is a schematic diagram of the electrical conduit; and Figure 23 is a schematic diagram of a modified cream control circuit.

In the following description, the structure and operation of the beverage preparing and dispensing machine will first be described in rather general terms to provide a basic understanding of the functioning of the various elements. The structure will then be described in more detail and finally the electrical control circuits will be discussed. The beverage preparing and dispensing machine will be described as handling two beverages, coffee and hot chocolate. It will be understood that these two beverages are used as examples to provide a clear picture of the operation of the apparatus and that other beverages, as tea and soups could be handled in a similar manner.

Turning now to Figure 1 of the drawings, the front panel or door 100 of a cabin or housing 101 containing the elements of the apparatus, is illustrated. A coin slot 102 is provided for the customer to insert a suitable coin to initiate the dispensing operation of the machine. A coin release lever and coin return slot 103 are also provided on the front panel. An opening 104 permits drainage of spilled liquid. A selector dial 105 with a selector switch 106 permits the customer to designate the beverage he wishes. These may be, for example, black coffee, coffee with sugar, coffee with cream, coffee with cream and sugar, and hot chocolate. A pair of push buttons 107 and 108 enable the customer to secure extra quantities of cream and sugar in the selected drink. An access opening 109 in the front panel 100 is provided with an access door 110. As will appear in more detail below, the selected beverage is dispensed into a cup supported on a cup carrier or turntable which delivers the filled cup through access opening 109 to a point in front of panel 100 where it is readily accessible to the customer. The access door 110 is, of course, opened to permit passage of the cup through the opening. Immediately below the selector dial 105 are a plurality of indicator lights, the purpose of which will be apparent later.

Figure 2 illustrates the placement of the major elements of the dispensing apparatus within the housing 101. The cup supply and dispensing mechanism 111 is swung back on its pivotal mounting 112 to provide access to the mechanism mounted behind it. In the upper portion of the housing is a percolator supporting rack or wheel 113 on which are mounted a plurality of percolators 114, in two rows, one behind the other. Adjacent the upper portion of the rotatable percolator wheel 113 is a brewing station, indicated generally as 115, at which suitable connections are made to the percolators for introducing hot water thereto to brew coffee, which is then conducted through suitable hoses to one or the other of the coffee holding tanks 116 and 117, each of which is provided with a hermetically sealed heating unit to keep the coffee at the proper temperature. A refrigerated compartment 118 is located below the percolator wheel 113 and contains the supplies of perishable beverage ingredients. In the embodiment of the invention illustrated, the refrigerator contains three cream bottles 119a, 119b, and 119c, and a bottle of chocolate 120.

A rotatably mounted turntable 125 is located below the refrigerated compartment 118, and receives cups from the cup supply 111 through a chute 126. A cup delivered to the turntable is moved from a point below the cup dispenser chute to a dispensing point 127 at which it is filled with the selected beverage. The various ingredients are directed from the ingredient supplies to the dispensing point through suitable conduits, as will appear. In the lower portion of the cabinet are a water heating tank 128, a waste receptacle 129, and an air compressor 130. Refrigeration apparatus for the cooler box 118 is mounted behind the pivoted rack 131 in which many of the electrical control elements are mounted. A supply of liquid sugar is located in a container 132 mounted on the rear surface of front panel 100 (Figure 3), and connected with the dispensing point by a conduit 133.

With the machine in operation, an empty cup is positioned at the dispensing point. When a customer actuates the dispensing circuits, as by depositing a coin, the desired drink is delivered to the cup, the turntable rotates and the cup is delivered to the customer. When a cup of coffee is selected, the coffee is dispensed into the cup from one of the two tanks 116 and 117, together with cream or sugar, or both, as may be desired. The coffee dispensing timer is so designed that the dispensing period is increased upon successive dispensing cycles from each tank so that the quantity of coffee delivered on each serving is substantially the same, although the level of coffee in the tanks drops with each serving, reducing the head or pressure and thus the rate of flow of the coffee. Hot chocolate is prepared by dispensing a quantity of chocolate from the supply in container 120, mixing with it a quantity of hot water from the tank 128, and adding a serving of cream.

When the supply of coffee in the warming tank from which coffee is being dispensed is depleted, the system operates to prepare a fresh supply of coffee and to dispense coffee from the other tank, which is standing full. The percolator wheel 113 turns, as necessary, to bring fresh percolators into the brewing position.

The various mechanisms will now be described in detail.

Turntable 125 is driven through a gearing arrangement 134 by a motor 135 located beneath the turntable, which is operated at the proper times by the electrical control circuit, as will appear. Beneath the turntable is an annular drip trough 136 which receives any spilled liquid from the cups carried on the turntable and is connected by a drain hose 137 with the waste tank 128. The turntable is controlled in such a manner that it turns one-third of a revolution, or 120°, upon each dispensing operation. A wiping blade 138 mounted on the rear of front panel 100 engages the top surface of the turntable as it rotates, wiping spilled liquid therefrom. Adjacent the cup drop position is a gate member 139 pivotally mounted on the frame of the housing and urged by spring 139b to a position in which it extends across a portion of the surface of the turntable, restraining a dropped cup so that the turntable moves underneath it. A finger 139a extends below the surface of the turntable for engagement with one of a series of three cams 140 which open the gate at the proper point to permit a cup delivered from the cup supply to turn with the turntable. Adjacent the dispensing position, a cup supporting member 141 is pivotally mounted and is spring urged in a direction in which the cup supporting portion 141a thereof is inoperative. A finger 141b extends below the surface of turntable 125, for engagement by cam 140, moving the cup supporting member to operative position when the cup is at the dispensing point. The portion 141a provides support for the cup preventing it from being knocked over by the force of the liquid dispensed into it. The turntable 125 is provided with three recesses 142 in which the cups are received during movement of the table, preventing them from sliding about. Screens 143 in the bottom of the recesses permit any spilled liquid to drain into the drip pan 136.

A protective door 144 is pivotally mounted about a horizontal axis and hangs in front of the dispensing point 127 to prevent removal of a cup at the dispensing point.

When the turntable rotates an arm 145 on the turntable engages protective door 144 lifting it out of the way to permit the filled cup of beverage to pass.

The cycle of operation of the turntable is best understood by referring to Figures 15-18. In Figure 15, the turntable is shown in its starting position, waiting for the dispensing circuits to be actuated. An empty cup 146 is located at the dispensing point 127 and is engaged by the curved supporting portion 141a of the cup support, while second cup 146a is located on the turntable, 120° away. Cup protective door 144 is closed as is the access door 110 covering the access opening 109 in the front panel 100. Upon actuation of the dispensing circuits, the desired beverage is delivered to the cup 146 at the dispensing point 127, Figure 15. The remainder of the elements of the mechanism remain in their starting positions during the actual dispensing operation. After the cup has been filled, the turntable begins to rotate, Figure 17. The cup protector door 144 is opened by arm 145, permitting the filled cup 146 to pass. At the same time, the access door is opened. In the meantime, the cup dispensing mechanism has operated, dropping a third cup 146b onto the turntable. However, gate 139 remains closed until cam 140 engages finger 139a, as cup 146d slides into a cup recess 142, whereupon the cup turns with the turntable. The filled cup 146 is delivered through access opening 109 to a point in front of the panel 100 where it may be lifted off by the customer. Should the customer not remove the cup and a further dispensing operation be initiated, the continued movement of turntable 125 moves the filled cup against the front panel 100 as indicated in broken lines at 146', camming the cup onto shelf 147.

Referring now to Figures 13 and 14, the mechanism at the dispensing point 127 is illustrated in detail. A cup 146 is located on turntable 125 with the cup support member 141 in operative position, the arm 141a engaging the surface of the cup by virtue of the interaction of cam 140 and finger 141b. Above the cup at the dispensing position are the discharge ends of the various beverage ingredient conduits, of suitable material, as a flexible plastic. Conduits 150 and 151 are connected with coffee warming tanks 116 and 117, respectively, conduit 133 is connected with the sugar supply on the rear of front panel 100, Figure 3. Three conduits 152, 153, and 154 are connected with the three cream supply containers 119a, 119b, and 119c, and join in a fitting 155 connected with a tube 156 which directs the cream into the cup. Chocolate syrup from container 120 and hot water from tank 123 are directed through conduits 157 and 158, respectively to a block 159 having an interior cavity in which the syrup is preliminarily mixed with the hot water discharged through nozzle 160 into the cup where it is combined with a serving of cream. Nozzle 160 is provided with a venturi arrangement 160a which draws air into the syrup-water mixture, giving the drink a foaming appearance. It will be noted that the discharge ends of the various conduits and the nozzle 160 are located as close to each other as practical. Immediately beneath the discharge ends is a drip shutter 162 which has a trough-like shape and is provided with a drain tube 163 leading to the waste tank 129. During the dispensing operation, the drip shutter 162 is retracted to the broken line position of Figure 14 by an air operated piston and cylinder mechanism 164, there being a valve in the air supply line 165 which is operated in synchronism with the dispensing valves, as will appear from a consideration of the control circuit. When the dispensing operation ends, the shutter is released, returning to the position in which it is illustrated in the drawings, and subsequent drainage or dripping from the dispensing conduits flows across the shutter and through tubing 163 to the waste tank.

Mounted on the rear surface of front panel 100 are the operating mechanism for access door 110, the mechanism of selector switch 106, a funnel 168 associated with drain opening 104 and connected by conduit 169 with the waste tank, coin mechanism 170; and the mounting arrangement 171 for turntable wiper blade 138.

Access door 110 is a sheet member having a rearwarly extending flange 110a along the sides and bottom thereof. A resilient bumper 175 extends along the bottom and one end of the flange. A channel member 176 extends upwardly from one end of the door and receives a pin 177 mounted on bracket 178 on panel 100, providing a pivotal mounting for the door. The opposite end of door 110 is received between a bar 179 and panel 100 guiding movement of the door and preventing vandals from forcing the door inwardly. Projecting outwardly from channel member 176 is an extension plate 180 arranged to be engaged by actuating element 181 of a fluid operated piston and cylinder device 182, which when actuated engages extension 180 rotating door 110 about pivot 177, permitting cup 146 to pass outwardly through the access opening as turntable 125 rotates.

A latch 183 is pivotally mounted on bracket 184 above door 110 and normally hangs so that the lower end engages the top surface of the door. Latch operating solenoid 185 has an armature 186 which, when the solenoid is energized, moves downwardly engaging latch extension 187 rotating the latch about its pivot and releasing it from engagement with access door 110.

The access door operating device 182, Figure 21, includes a cylinder 190 having a piston 191 slidable therein with a spring 192 urging the piston upwardly. The door actuating rod 181 is secured to piston 190 and extends downwardly through the lower cylinder head 190a. The upper chamber of the cylinder is connected through a conduit 193, and a suitable valve (not shown in Figure 21) with a source of compressed air. When compressed air is admitted to the upper chamber of the cylinder, the piston is forced downwardly in turn opening the access door, and compressing return spring 192. When the valve closes, the return spring urges the piston upwardly, forcing the air out through a small relief opening 194. The size of this opening is selected to retard the return of the piston, and thus the closing of access door 110.

The cream supply system, Figure 2, which in the embodiment of the inveniton illustrated in the drawings includes three cream containers 119a, 119b, and 119c, provides an arrangement for dispensing the contents of one container then the contents of the next and finally the contents of the tihrd. Each of the containers is connected with the source of compressed air so that a positive pressure is maintained on the surface of the liquid, and through a conduit controlled by a valve, not shown in Figure 2, with the connector 155 at the dispensing point. In one form of the device, a counter is used which is actuated each time the dispensing valve is opened, and which automatically switches the dispensing circuit to another container when a predetermined number of servings have been dispensed from the first container. The details of the counter system will be discussed in connection with the electrical control circuits.

Referring particularly to Figures 19 and 20, a modification of the cream supply control is illustrated, in which a switch is actuated by the compressed air in the system when one container is emptied, automatically transferring operation of the system to the next container. The outlet tubes from the three cream containers are connected with nipples 196, 197, and 198 formed in a cap 199 for an air separator funnel 200. The cap is secured to the top of the funnel by a removable clip 201 and the joint between the two elements is sealed by an O-ring 202. Extending centrally upwardly from the cap 199 is a fourth nipple 203 which is connected through a suitable conduit with a pressure actuated switch. When the container from which cream is being dispensed empties, a blast of compressed air is transmitted through the tubing from the container to the air separator, and its force is communicated through nipple 203 and the attached tubing, to the pressure responsive switch which in turn operates suitable control circuits to effect dispensation from another cream container. The reduced funnel outlet 200a discharges the cream into a cup at the dispensing station without releasing the air pressure.

The percolator wheel 113 and its mounting are described fully in the aforementioned copending Arnett and Freise application and this detailed disclosure will not be repeated here; the showing in Figures 2, 11, and 12 sufficing for present purposes. The percolators 114, in the outer row and 114a, in the inner row, are carried adjacent the outer periphery of the wheel 113 on a support including pins 205 and brackets 206 which are provided with spring-urged balls 207 that hold the percolator containers in place. Located at the brewing position 115, Figure 11, are a pair of connectors 208 and 209, connected through conduits 210 and 211 with the water heating tank 128, through suitable valves, as will appear. Connectors 208 and 209 are mounted for vertical reciprotation upon actuation of air operated piston and cylinder devices 212 and 213. When compressed air is admitted through conduit 214 to the upper ends of the cylinders, the connectors 208 and 209 are forced downwardly through openings in the rim 113a of the wheel and into sealing engagement with the inlets of the percolators 114. When compressed air is admitted to the lower ends of the cylinders through conduit 215, the connectors are retracted, permititng the wheel to turn, to bring fresh percolators into brewing position. A piston and cylinder aligning device 216 is mounted in front of the percolator wheel and when actuated by connection with the source of compressed air through conduit 217 and a valve (not shown in Figure 11), the piston moves in the direction of the arrow forcing the percolators 114 and 114a rearwardly against wheel 113, insuring alignment of connectors 208 and 209 with the inlets of the percolators. Brewed coffee from the percolators is received in funnel-shaped members 218 and 219 from which it is directed through conduits 218a and 219a to the holding tanks 116 and 117.

Turning now to Figure 22, comprising portions 22A and 22B, the electrical circuit and its operation in controlling the operation of the machine will be described in detail. In addition to designating each of the elements of the circuit, as motors, timers, switches, valves, relays, and the like with reference numerals, various of the interconnecting leads will be assigned numbers to faciltate and simplify the description of the circuit, particularly in following a circuit from one sheet to the other. In this connection, the number assigned an electrical lead will apply to that lead, throughout the drawing, as it represents an identical point from the electrical standpoint, regardless of the physical location of the wire in the machine, or its placement or branching in the schematic representation of the circuit in the drawings. In the identification of the switch contacts associated with multiple cam timers, the following practice will be observed: each contact described will be designated by the number assigned to the timer motor followed by the number of the cam counting from left to right as the cams are shown in the drawing and a letter determined by the position of the contact from top to bottom.

The machine is energized from a suitable power source, as 110 volts A.C., through leads 225 and 226. A line fuse 227 is connected with lead 225 and serves several circuits as will be described. The neutral lead N is connected through line fuse 228 with lead 226. A primary power circuit 1 is connected through fuse 229 with fuse 227; and a motor power circuit 4 is connected through fuse 230 with fuse 227. A safety power circuit S is connected through pressure switch 231, associated with the compressed air system, fuse 232 and float operated switch 233, associated with the waste tank, with line fuse 227. Electrically operated water safety valve 245 is energized from the safety circuit, shutting off the water supply if switches 231 or 233 are opened.

The water heating tank 128 is provided with five heating bands 234a, 234b, 234c, 234d, and 234e. The energization circuit for the heating bands is completed through a thermostatic control switch 235 associated with the water tank and connected to the overflow switch 233, through three manual switches, 236a in the circuit of band 234a; 236b in the circuit of bands 234b and 234c; and 236c in the circuits of bands 234d and 234e. In addition, the circuits for bands 234d and 234e are completed through double-throw switches 237 and 238 associated, respectively, with the power circuits for the refrigeration motor 239 and the air compressor motor 138. When the refrigerator compressor motor 239 runs, the circuit to band 234d is broken; and when air compressor motor 130a runs the circuit for band 234e is broken. In this manner, the maximum power requirements for the machine are kept at a minimum.

The warming tank heaters 240 and 241 are energized from power line 1 through manual switch 242 and thermostatic switches 243 and 244, respectively.

A coin reject magnet 246 is associated with the coin handling mechanism and must be energized to permit a customer to insert a coin and initiate a dispensing operation. The coin reject magnet circuit may be traced from the safety power circuit S through contact 247a of manual service switch 247, normally closed contact 248a of percolator "sold-out" switch 248, contact 249—4a, associated with the dispensing step timer 249, lead 26, contact 250b associated with timer zero relay 250, lead 24, contact 251—2b associated with coffee timer 251, lead 41, contact 135—2a associated with turntable motor 135, lead 21, thermostatic cutout switch 252 (which breaks the circuit when the temperature of the water in heating tank 128 exceeds a predetermined value), normally closed contact 253a associated with cup "sold-out" switch 253, lead 32, contact 254b, associated with brewing set up relay 254, lead 33, contact 255d associated with chocolate syrup counter 255, lead 19, and manual switch 256. When these various switches and contacts are closed, the coin relay magnet 246 is energized and a dispensing operation may be initiated.

The dial selector 106 on the front panel 100 of the machine has associated with it a plurality of switches 106—1, 106—2, 106—3, and 106—4, which initiate the dispensation of the selected drink. Assuming that the customer dials black coffee, switch 106—1 is opened, contacts 106—2b and 106—3a are closed, and contact 106—4 is opened. A suitable coin deposited in the coin mechanissm actuates coin switch 260, closing contact 260b momentarily, completing a circuit from power lead 1 through contact 106—3a of the selector switch energizing coffee coin relay 261. Contact 261a closes completing a holding circuit from energized lead 21 (described above in connection with the coin reject magnet circuit) maintaining the relay in energized condition. When the coin passes coin switch 260, contact 260a closes, completing a circuit through contact 261b of the coffee coin relay energizing the starting circuits for coffee timer 251 and dispensing step timer 249, from power lead 1. The circuit for coffee timer 251 may be traced from lead 1 through switch 260a, contact 261b, lead 20, contact 251—1b, and lead 262. The starting circuit for the dispensing step timer 249 is completed from lead 20 through contact 249—1b, lead 25, and contact 250d of the timer zero relay 250.

As the two timers start, contacts 249—1a and 251—1a close completing running circuits directly from power lead 1, so that the timers then operate for a complete cycle. As the running circuit for coffee timer 251 is completed, cam switch 251—2b opens, breaking the circuit of coin reject relay 246 and also interrupting the power applied to the holding circuit for coffee coin relay 261, which is derived from the coin reject magnet circuit. This prevents initiation of a dispensing operation when one is in progress.

Cam switch 251—3a closes completing a circuit from power lead 1 through lead 34 to the switch associated with the #2 cam of dispensing step timer 249. As soon as contact 249—2a closes a circuit is completed through lead 59 energizing one of the coffee dispensing valves 263 and 264 depending upon the condition of contacts 265—3a and 265—3b associated with the third cam of the brewing control timer 265. In the condition of the circuit shown, contact 265—3b is closed and valve 263 is energized dispensing from tank 116.

The switch operating portions of cam 249—2 are of constantly increasing width so that contact 249—2a closes for increasingly longer periods upon each succeeding dispensing operation. In this manner, the quantity of coffee dispensed upon each actuation of the dispensing circuit is maintained substantially constant although the level of coffee in the dispensing tank drops, and the head or pressure in the gravity dispensing system, decreases with each drink dispensed.

Connected to the lead 262, in parallel with coffee timer 251 is a circuit completed through contact 361—2b associated with the cup drop motor and contact 270—5b associated with the chocolate dispenser timer 270, energizing air valve 269 associated with the operating device 164 for the spout shutter 162. Thus, the spout shutter is opened as soon as coffee timer 251 is energized, and remains open until the cup drop motor 361 starts.

After the coffee has been dispensed, contact 249—2a opens, contact 249—2b closes, and step timer cycle cam opens contact 249—1a stopping the timer. At this point, a circuit is completed from energized lead 34 through contact 249—2b, lead 35, contact 251—4b, lead 30 and contact 361—1b starting cup drop motor 361. The initial movement of cup motor 361 opens contact 361—1b and closes contact 361—1a completing a running circuit for the cup motor from power lead 1. After the cup motor has run approximately one-half the cycle, contact 361—1c closes, completing a circuit from power line 1 through lead 267 and contact 135—1b starting turntable motor 135. The initial movement of cycle cam 135—1 opens contact 135—1b, closes contact 135—1a completing a running circuit from the turntable motor directly from lead 1. In the meantime, a cup has dropped and the turntable completes operation as described above, moving the filled cup out to the customer and positioning an empty cup at the dispensing point.

Connected in parallel with the turntable motor 135 is an air valve 268, associated with the door opening mechanism 182, and the door latch release solenoid 185, energization of which opens the door as the turntable starts to move. In the meantime, coffee timer 251 and cup dispensing motor 361 complete their cycles and return to the positions shown in the drawing, in readiness for another dispensing cycle.

If the customer has ordered coffee with either cream or sugar, contacts 106—1 and 106—2a, associated with the sugar and cream, respectively, are closed. These contacts complete circuits from lead 59 (energized by contact 249—2a) through leads 48 and 11, respectively, to the sugar and cream timers 272 and 273. The sugar dispensing circuit is completed through contact 272b and lead 69 to the sugar valve 274. The cream circuit is completed through contact 273b and lead 70 to the cream dispensing control.

It will be recalled that the cream supply includes three bottles of cream, the outlet valve of one of which is opened to permit the desired quantity of cream to be dispensed by air pressure. A cream dispense control counter 275 controls the position of cam 275—1 which has associated with it four sets of double throw switches.

The outer pair of switches are connected with leads 70 and couple the cream dispensing impulse from cream timer 273 with the selected one of the cream dispensing valves 276a, 276b, and 276c. The cream dispensing impulse on lead 70 is also coupled through contact 275—2a associated with the cream selector cycle cam 275—2, energizing timer 275 briefly on each dispensation of cream. When a predetermined number of cream servings have been made, as determined by the quantity of cream served on each actuation and the capacity of the cream container, contact 275—2b closes connecting coffee selector motor 275 to lead 1 operating the motor to shift cam 275—1 to the next position altering the connections of the outer pair of switches changing the cream valve to be actuated. Manual valves 277a, 277b, and 277c are provided for connecting the cream valves with power lead 1 to prime the cream system when fresh containers are placed in service. The inner pair of switches associated with cam 275—1 actuate signal lights 278a, 278b, and 278c to indicate the bottle from which cream is being served.

Extra portions of cream and sugar may be secured by actuating push-button switches 107 and 108 on the front panel of the machine. These switches complete circuits from lead 262, the running power lead for coffee timer 251, through contact 251—5b, lead 16, leads 18 and 17, and contacts 272a and 273a respectively, energizing the cream and sugar circuits a second time at the end of the initial operation.

When a customer selects hot chocolate, selector switch contacts 106—2b and 106—3b are closed. The insertion of a coin actuates coin switch 260, as described before, the closing of contact 260b completing a circuit from lead 1 energizing chocolate coin relay 280. Contact 280a closes completing a holding circuit for the relay from line 1 through contact 270—1b and lead 22. Contact 280b closes completing a circuit from lead 1 through contact 260a of the coin switch and lead 13 starting chocolate timer motor 270. The initial movement of coffee timer cycle cam 270—1 opens contact 270—1b breaking the holding circuit for the chocolate coin relay and closing contact 270—1a completing a running circuit from power lead 1 to the chocolate timer motor. At the same time, contact 270—5a closes, completing a circuit from lead 13 to energize the valve 269 in the spout shutter system, retracting the shutter. Chocolate and water control switches 270—2a and 270—3a, respectively, close, completing circuits from safety power lead S, through lead 28 to energize the chocolate valve 282 and through lead 71 to actuate water valve 283. Connected in parallel with the chocolate valve to lead 28 is contact 106—2b of the selector switch through which the cream dispenser 273 is actuated during the hot chocolate dispensing cycle. After the dispensing period for the chocolate and water is completed, and contacts 270—2a and 270—3a open and contact 270—4a closes, completing a circuit from power lead 1 through contact 361—1b to cup dispenser motor 361 starting the cup dispenser and turntable cycle which proceeds as described above.

Operation of the coffee brewing mechanism is initiated by the dispensing step timer 249 after the last cup of coffee has been dispensed from the container. Contact 249—3a closes completing a circuit from power lead 1 through lead 49 energizing brewing set up relay 254. Contact 254a closes, completing a holding circuit for the relay through lead 50 and contact 265—10a of the brewing control timer to power lead 1. Contact 254b in the coin reject magnet circuit opens preventing initiation of a dispensing cycle. Connected in parallel with brewing set up relay 254 is a circuit completed through contact 285a of the water control relay and contact 265—1b starting brewing control timer 265. Coffee brewing indicator light 284 is likewise connected in parallel with the brewing set up relay.

The principal purpose of brewing control timer 265 is to control brewing into and dispensing from the proper one of the two coffee holding tanks 116 and 117. With the position of the cams as illustrated in the drawing, the initial movement of the timer performs several functions. Contact 265—2a closes completing a circuit from power lead 1 through lead 57 energizing air valves 286 and 287 in the air supply to the piston and cylinder devices 212 and 213 associated with the pressure connectors in the percolator brewing water supply. With these valves energized, conduit 214 is vented and conduit 215 is connected to the air pressure supply lifting the connectors away from the percolators. Conversely, when the valves 286 and 287 are not energized, conduit 215 is vented and conduit 214 is connected to the air pressure system moving the connectors 208 and 209 into engagement with the percolators.

Contact 265—3b opens and contact 265—3a closes readying the circuit for dispensing from the holding tank 117 which is standing filled. Contact 265—4a closes, completing a circuit from energized lead 31 through lead 61 to the dumping valve 288 associated with the holding tank which has just been substantially emptied. This drains any residual coffee from the tank into the waste receptacle 129. After a quarter revolution of the cams (one-half of a cycle) contacts 265—6b and 265—7b close readying portions of the brewing circuit for operation, as will appear.

Contact 265—9a closes completing a circuit from energized lead 31 starting the percolator index motor 290 to turn the wheel 113. The initial movement of the percolator wheel opens contact 290b and closes contact 290a of the percolator motor index switch completing a running circuit for the index motor from energized lead 31. As the wheel moves a pair of fresh percolators into the brewing position, contact 290a opens, stopping the motor and contact 290b closes. In the meantime, contact 265—10a opens momentarily breaking the holding circuit for set up relay 254, the contacts of which are released completing the energizing circuit for coin reject magnet 246, permitting the initiation of a dispensing operation.

Shortly after the start of the percolator index cycle, contact 265—8a closes completing a circuit from power lead 1 energizing latch coil 285 of the water control relay opening contact 285a and closing contact 285b. Connected in parallel with latch coil 285 is valve 291 in the air system of percolator aligning piston and cylinder 216, which operates forcing the percolators rearwardly against the back wall of wheel 113 to position them properly with respect to the connectors 208 and 209. At the end of the cycle of brewing control timer 265, when the running circuit is broken by the opening of contact 265—1a, contact 265—2a opens breaking the energization circuit for connector control valves 286 and 287 releasing the air in conduit 215 and applying air pressure into conduit 214 to force the connectors downwardly into sealing engagement with the inlets of the percolators.

The circuit for the brewing water control valves is completed from energized lead 31 through contact 290b of the percolator wheel index switch, lead 37, contact 285b of the water control relay, lead 53 and the contacts associated with the cam 265—7 on the brewing control timer 265. In the operation which has been described above, these cams have turned through 180° and contact 265—7b is closed completing the circuit through lead 67 energizing brew valve 292 associated with the outer row of percolators and holding tank 116.

Brewing is terminated by a control circuit including level measuring electrodes 295 and 296 in tanks 116 and 117, respectively. The measuring circuit is energized through a transformer 297 having its primary winding 297a connected between safety power lead S and neutral lead N. One terminal of secondary winding 297b is connected through contact 247b of the service switch with a mechanical ground 298 in the cabinet, and to which the coffee holding containers are connected. The other terminal of the secondary winding 297b is connected with relay 299, the energization circuit of which is completed through contact 265—6b and measuring electrode 295. When the level of brewed liquid reaches the electrode, the circuit of relay 299 is completed through the liquid, and contact 299a closes completing a circuit from power lead 1 through lead 54 energizing water relay unlatch coil 285', the contacts of which move to the position shown in the drawing breaking the circuit to water brewing valve 292.

On alternate brewing operations, the percolator index wheel does not turn. Tank 117 is emptied by a dumping circuit completed through contact 265—5a, and lead 62 brewing valve 293 is energized through contact 265—7a; and lead 66 and control electrode 296 is rendered operative through contact 265—6a.

A program timer 300 is connected to power lead 1 and may be set to dump the stale coffee standing in the warming tanks and cause the preparation of fresh coffee at a predetermined time. For example, where the machine is located in an office or plant which does not work over the weekend, the machine may be left in operation for the convenience of maintenance personnel or guards, and the program timer adjusted to prepare fresh coffee early on Monday morning. When the timer has completed its cycle, contact 300a closes completing a circuit from energized lead 31 energizing timer zero relay 250. A holding circuit for the relay is completed through contact 250a, lead 26 and contact 249—4a associated with the zero cam of the step dispenser timer 249 to energized lead 31. Contact 250b in the circuit of coin reject magnet 246 opens preventing initiation of a dispensing operation. Contact 250c closes completing a circuit from power lead 1 to the step dispensing timer motor 249, running it continuously, but not energizing coffee timer 251. As the dispensing timer runs, contact 249—3a closes completing the energization circuit for set up relay 254, and the brewing operation proceeds as previously described, with stale coffee in the holding tank being drained into the waste tank 129 by the dumping valve. As the set up relay is energized, contact 249—4a opens breaking the holding circuit for the zero relay at the proper point for the relay to start the next dispensing operation. Fifteen minutes later, contact 300a is closed again to dump the stale coffee from the second tank and effect brewing of another fresh supply, as described above.

A coffee sales counter 302 is connected in the coffee dispensing circuit and energized each time contact 249—2a in the step dispensing timer closes to serve a cup of coffee. Total sales counter 303 is connected in parallel with turntable drive motor 135 and is energized each time the turntable operates. Chocolate drink counter 255 is connected, through lead 28, in parallel with chocolate dispensing valve 282 to record the number of chocolate drinks dispensed.

Associated with the chocolate counter is a chocolate "sold-out" switch arrangement including normally closed contacts 255b in the circuit of coin reject magnet 246. The chocolate counter 255 is preset for the number of drinks which will be dispensed at the time a full container of chocolate syrup is placed in the machine. When these drinks have been dispensed (and the container is substantially empty) contact 255b opens breaking the energization circuit for the coin reject magnet and closing contact 255a in the circuit, through lead 29, of "No Chocolate" light 305. Contact 106—4 on the selector switch is connected in parallel with contact 255b and is closed except when the dial is set for hot chocolate. Thus, even though the chocolate supply may be depleted and contact 255b opened, the dispensing of coffee is not prevented.

When the cup supply is exhausted, cut "Sold-out" switch 253 is actuated opening contact 253a in the circuit of the coin reject magnet and closing contact 253b energizing "Sold-out" light 306. When the supply of percolators is exhausted, percolator "Sold-out" switch 248 is actuated opening contact 248a and closing contact 248b. Contact 248a is in the circuit for auxiliary power lead 31 through which the dumping circuits, percolator indexing circuits and certain of the dispensing control circuits are energized. Thus, when all the percolators have all been used, the machine is shut down. Contact 248b is in the circuit of "Sold-out" light 306.

Figure 23 is a schematic diagram for a cream dispensing control circuit used with the air impulse switchover of Figures 19 and 20. The cream dispensing signal or impulse appears on lead 70 from the cream timer 273 of Figure 22; and lead 1 is a power lead, as in Figure 22. The cream impulse is connected through one of the contacts, as contact 310a, of rotary selector switch 310 to actuate cream dispensing valve 276a'. Rotary selector switch 310 is actuated by a rotary solenoid 311 which is energized from a capacitor 312. The capacitor is charged from power lead 1 through a rectifier 313 and a current limiting resistor 314. When the first cream container is emptied, a blast of air through the system closes pressure switch 315 completing the energization circuit for relay 316 closing contacts 316a, completing a holding circuit, and 316b connecting the capacitor 312 across rotary solenoid 311. The solenoid moves selector switch 310 to the next position, completing the cream dispensing circuit through contact 310b, to energize cream dispensing valve 276b'. At the end of the cream dispensing period, the signal on lead 70 is terminated releasing relay 316 closing contact 316c to complete the charging circuit for capacitor 312, allowing it to charge up in readiness for the next operation. When the cream in the second container is exhausted, the operation is repeated switching the rotary selector switch to contact 310c in the circuit of cream dispensing valve 276c'. Manual switches 277a', 277b', and 277c' permit the serviceman to prime the cream systems.

While we have shown and described certain embodiments of our invention, it is to be understood that it is capable of many modifications. Changes therefore, in the construction and arrangement may be made without departing from the spirit and scope of the invention as disclosed in the appended claims.

We claim:

1. In a beverage dispensing machine: a housing having a panel with an opening therein; a source of beverage in said housing; a source of cups in said housing; a rotatable, generally circular cup carrier in said housing, having a portion extending outwardly through the opening therein forming a shelf outside said housing; means for placing a cup on said carrier; means for moving said carrier to position said cup at a dispensing point; means for dispensing a beverage portion from said source into said cup; and means for rotating said carrier to move said beverage containing cup through said opening to a position outside said housing.

2. In a beverage dispensing machine: a housing having a panel with an opening therein; a source of beverage in said housing; a source of cups in said housing; a movable cup carrier in said housing and having a portion movable through said opening to a portion outside said housing; means for placing a cup on said carrier portion; means for dispensing a portion of beverage from said source into said cup; means for moving said cup carrying portion of the carrier, with the beverage containing cup thereon through said opening, to a position outside said housing; and a shelf adjacent said carrier portion, whereby a beverage containing cup which is not removed from the carrier is cammed from the carrier onto said shelf, upon further movement of the carrier.

3. In a dispensing machine: a housing having an opening therein; means for dispensing a product onto a movable carrier; means for moving the portion of said carrier with the dispensed product thereon through the opening in said housing; a door for said opening; means, operable in synchronism with said moving means for opening said door; a releasable latch for said door; and means operable in synchronism with said moving means for releasing said latch.

4. In a dispensing machine: a housing having an opening therein; means for dispensing a product onto a movable carrier; means for moving a portion of said carrier with the dispensed product thereon through the opening in said housing; a door for said opening; means actuable to open said door means, operable in synchronism with said moving means, for actuating said door opening means to permit said product to pass through the opening; and means operative on termination of actuation of said door opening means for retarding closing of the door.

5. In a beverage dispensing machine: a movable cup carrier; a source of cups; a source of beverage including means for directing beverage to a dispensing point adjacent said carrier; means for moving said carrier; means for placing a cup on said carrier; a movable restraining gate adjacent the point at which a cup is placed on the carrier; a cam on the carrier for effecting release of said gate; and means for stopping said carrier with said cup adjacent said dispensing point.

6. In a beverage dispensing machine: a cup carrier; a cup supply; a source of beverage including means for directing beverage to a dispensing point adjacent said carrier; means for positioning the cup from said supply on said carrier at said dispensing point; a movable support member having an operative and an inoperative position, supporting said cup at said dispensing point in its operative position to prevent the force of dispensed beverage from upsetting the cup; and means including a cam surface associated with said carrier for moving said support member into operative position when a cup is positioned at said dispensing point, and to an inoperative position at other times.

7. In a beverage dispensing machine: a housing having a panel with an opening therein; a source of beverage in said housing; a source of cups in said housing; means for dispensing beverage from said source to a dispensing point; means for directing a cup from said source to a cup positioning point; a rotatable, generally circular cup carrier having a portion extending through said opening, and being movable past said cup positioning point, said beverage dispensing point, and a delivery point outside said housing; and control means responsive to actuation for effecting a dispensing operation, including means for actuating said beverage dispensing means to dispense a quantity of beverage into a cup at said dispensing point, means for actuating said cup directing means to place an empty cup on said carrier at said cup positioning point, and means rendered active following operation of said dispensing means for rotating said carrier, moving the filled cup through the opening in said housing to said delivery point and an empty cup to said dispensing point.

8. In a beverage dispensing machine: a housing having a panel with an opening therein; a source of beverage in said housing; a source of cups in said housing; means for dispensing beverage from said source to a dispensing point; means for directing a cup from said source to a cup positioning point; a rotatable, generally circular cup carrier having a portion extending through said opening, and being movable past said cup positioning point, said beverage dispensing point, and a delivery point outside said housing; and control means responsive to actuation for effecting a dispensing operation, including means for actuating said beverage dispensing means to dispense a quantity of beverage into a cup at said dispensing point, means for actuataing said cup directing means to place an empty cup on said carrier at said cup positioning point, and means rendered active following operation of said dispensing means for rotating said carrier, moving the filled cup through the opening in said housing to said delivery point and an empty cup to said dispensing point; and cup restraining means operable in synchronism with the rotation of said carrier for positioning an empty cup at a desired point on said carrier.

9. In a beverage dispensing machine: a housing having a panel with an opening therein; a source of beverage in said housing; a source of cups in said housing; means for dispensing beverage from said source to a dispensing point; means for directing a cup from said source to a cup positioning point; a rotatable, generally circular cup carrier having a portion extending through said opening, and being movable past said cup positioning point, said beverage dispensing point, and a delivery point outside said housing; and control means responsive to actuation for effecting a dispensing operation, including means for actuating said beverage dispensing means to dispense a quantity of beverage into a cup at said dispensing point, means for actuating said cup directing means to place an empty cup on said carrier at said cup positioning point, and means rendered active following operation of said dispensing means for rotating said carrier, moving the filled cup through the opening in said housing to said delivery point and an empty cup to said dispensing point; and a cup support operably associated with said carrier at said dispensing point and operable in synchronism with rotation of the carrier to support a cup during filling.

10. In a beverage dispensing machine: a housing having a panel with an opening therein; a door for said opening; a source of beverage in said housing; a source of cups in said housing; means for dispensing beverage from said source to a dispensing point; means for directing a cup from said source to a cup positioning point; a rotatable, generally circular cup carrier having a portion extending through said opening, and being movable past said cup positioning point, said beverage dispensing point, and a delivery point outside said housing; and control means responsive to actuation for effecting a dispensing operation, including means for actuating said beverage dispensing means to dispense a quantity of beverage into a cup at said dispensing point, means for actuating said cup directing means to place an empty cup on said carrier at said cup positioning point, and means rendered active following operation of said dispensing means for rotating said carrier, moving the filled cup through the opening in said housing to said delivery point and an empty cup to said dispensing point; and means for opening said door actuated in synchronism with rotation of said carrier.

References Cited in the file of this patent

UNITED STATES PATENTS

| | | |
|---|---|---|
| 1,602,686 | Leet | Oct. 12, 1926 |
| 1,746,597 | Lind | Feb. 11, 1930 |
| 1,882,812 | Gunn | Oct. 18, 1932 |
| 1,895,745 | Asenbaum | Jan. 13, 1933 |
| 1,953,291 | De Vry | Apr. 3, 1934 |
| 2,283,652 | Schwarzkopf | May 19, 1942 |
| 2,317,006 | Weightman | Apr. 20, 1943 |
| 2,424,133 | Allcock | July 15, 1947 |
| 2,529,395 | Hummel | Nov. 7, 1950 |
| 2,591,507 | Brous | Apr. 1, 1952 |
| 2,645,461 | Brown et al. | July 14, 1953 |
| 2,667,990 | Mojonnier | Feb. 2, 1954 |
| 2,682,976 | Melikian et al. | July 6, 1954 |
| 2,682,984 | Melikian et al. | July 6, 1954 |
| 2,761,200 | Arnett | Sept. 4, 1956 |
| 2,803,381 | Vouderis | Aug. 20, 1957 |
| 2,811,993 | Ferndon | Nov. 5, 1957 |
| 2,813,965 | Arnett | Nov. 19, 1957 |
| 2,814,317 | Gale | Nov. 26, 1957 |
| 2,817,935 | Fischer et al. | Dec. 31, 1957 |
| 2,827,927 | Findlay | Mar. 25, 1958 |
| 2,828,684 | Graham et al. | Apr. 1, 1958 |
| 2,830,142 | Smith | Apr. 8, 1958 |
| 2,830,528 | Arnett | Apr. 15, 1958 |
| 2,840,274 | Arnett et al. | June 24, 1958 |